(12) United States Patent
Ohkado

(10) Patent No.: US 6,397,013 B1
(45) Date of Patent: May 28, 2002

(54) CAMERA AND METHOD FOR INSPECTING THE CAMERA

(75) Inventor: Teruyuki Ohkado, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/510,394

(22) Filed: Feb. 22, 2000

(30) Foreign Application Priority Data

Feb. 25, 1999 (JP) ............................................. 11-047672

(51) Int. Cl.[7] ................................................ G03B 17/24
(52) U.S. Cl. ...................................... 396/319; 396/321
(58) Field of Search ............................... 396/409, 319, 396/320, 321; 360/25, 31

(56) References Cited

U.S. PATENT DOCUMENTS

| | | | | |
|---|---|---|---|---|
| 4,796,109 A | * | 1/1989 | Sordello et al. | 360/45 |
| 5,302,986 A | * | 4/1994 | Kazami | 396/319 |
| 5,416,546 A | * | 5/1995 | Izukawa | 396/319 |
| 5,749,007 A | * | 5/1998 | Sakurai | 396/319 |
| 5,887,206 A | * | 3/1999 | Sasaki et al. | 396/319 |
| 5,991,550 A | * | 11/1999 | Sasagaki et al. | 396/319 |

* cited by examiner

Primary Examiner—David M. Gray
(74) Attorney, Agent, or Firm—Robin, Blecker & Daley

(57) ABSTRACT

A camera includes a magnetic head member arranged to read magnetic information recorded in each of a plurality of frames on a film, a transport member for transporting the film, a speed detecting circuit for detecting transport speed information indicative of a speed of at least one frame which is being transported by the transport member, a level detecting circuit for detecting a signal output level of magnetic information read out from the at least one frame by the magnetic head member, and a storage element for storing the transport speed information detected by the speed detecting circuit and the signal output level detected by the level detecting circuit. The camera is thus arranged to permit inspection of the magnetic information reproducing capability of the camera by detecting the transport speed information and the signal output level.

10 Claims, 4 Drawing Sheets

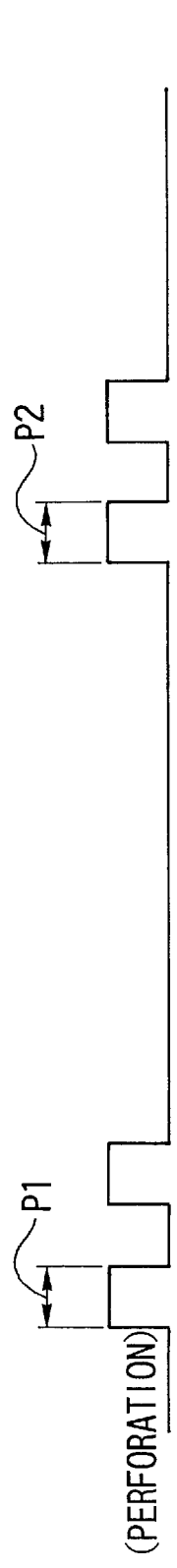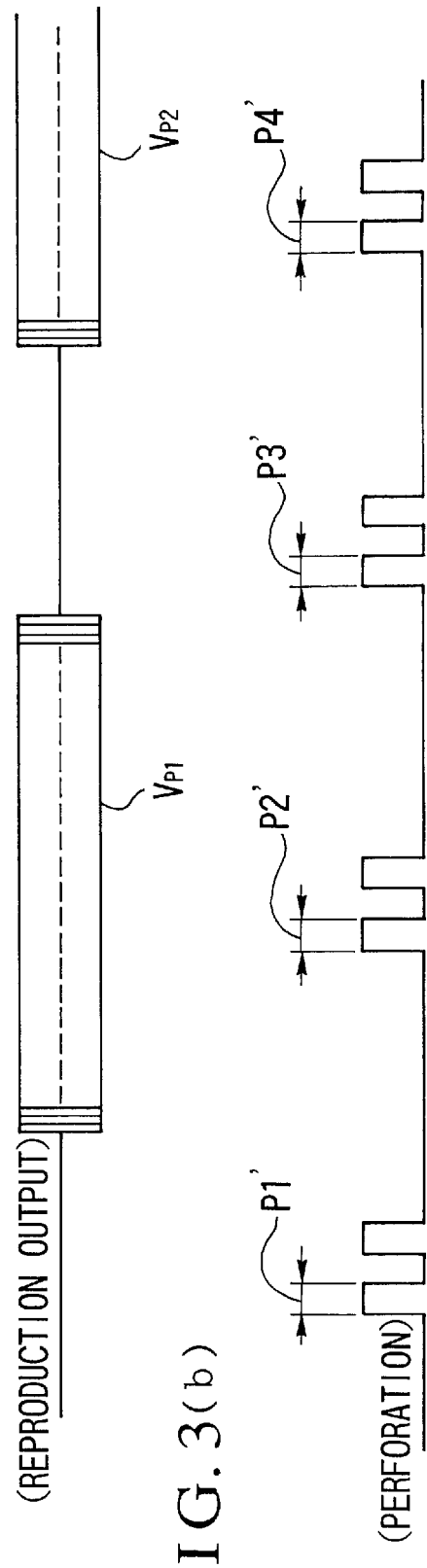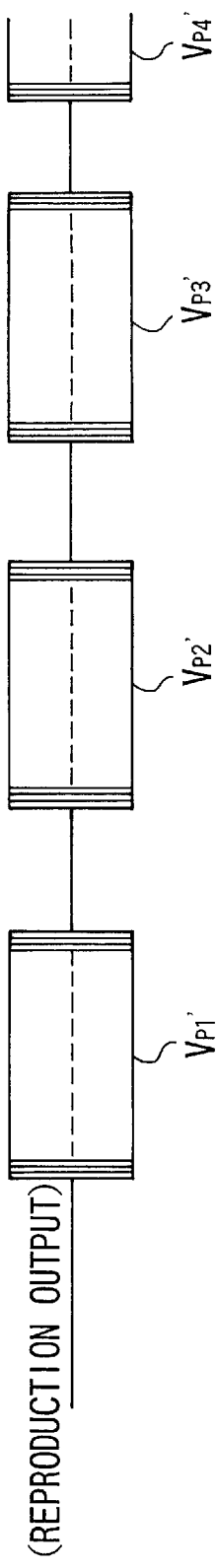
FIG. 3(a)
FIG. 3(b)

CAMERA AND METHOD FOR INSPECTING THE CAMERA

BACKGROUND OF THE INVENTION

1. Field of the Invention

The present invention relates to a camera having a magnetic head arranged to reproduce magnetic information and a method for inspecting the reproducing capability of the camera.

2. Description of Related Art

It is known to arrange a camera to have a self-inspecting function which can be used when the camera is in the process of manufacture. For example, a camera disclosed in Japanese Laid-Open Patent Application No. Hei 7-270985 is arranged to indicate an optimum tracking position of a magnetic head by reproducing information recorded in a magnetic recording track when the camera is loaded with a film cartridge having the magnetic information recorded in the magnetic track on a film in a state of being arranged stepwise in the direction of a width of the film.

In manufacturing cameras of the kind having the magnetic record reproducing function, it is one of indispensable inspection procedures to test the camera to ensure that the camera is capable of giving an adequate reproduction output of magnetic information recorded. The reproduction output varies with the rate of mounting error of the magnetic head, fluctuations in amplification factor of a reproducing circuit, differences among individual magnetic heads manufactured, etc. In addition to these factors, the reproduction output also varies greatly with the transport speed at which the film is transported during reproduction of magnetic information. Therefore, it has been difficult to ascribe variations or fluctuations of a reproduction output to any specific cause, even if the actual reproduction output of magnetic information recorded is tested and evaluated.

BRIEF SUMMARY OF THE INVENTION

It is a first object of the invention to provide a camera arranged to give information on a film transport speed and the output level value of a reproduced signal for each frame of a film by storing the information in a storage means for an inspection of the reproduction output of magnetic information to be made when the camera is in process of manufacture, so that the inspection or a test can be simplified.

It is a second object of the invention to provide a camera inspecting method whereby an inspection of the magnetic information reproducing capability of a camera to be made when the camera is in process of manufacture can be simplified.

To attain the above objects, in accordance with an aspect of the invention, there is provided a camera, which comprises a magnetic head member arranged to read magnetic information recorded in each of a plurality of frames on a film, transport means for transporting the film, speed detecting means for detecting transport speed information indicative of a speed of at least one frame which is being transported by the transport means, level detecting means for detecting a signal output level of magnetic information read out from the at least one frame by the magnetic head member, and storing means for storing the transport speed information detected by the speed detecting means and the signal output level detected by the level detecting means.

In accordance with another aspect of the invention, there is provided a camera, which comprises a magnetic head member arranged to read magnetic information recorded in each of a plurality of frames on a film, transport means for transporting the film, first storing means for storing transport speed information indicative of a speed of at least one frame which is being transported by the transport means, and second storing means for storing a signal output level of magnetic information read out from the at least one frame by the magnetic head member.

In accordance with a further aspect of the invention, there is provided an inspecting method for a camera having a magnetic head arranged to read magnetic record information recorded on a film, which comprises a storing step of reading, with the magnetic head, the magnetic record information recorded at a certain frame of the film and storing the magnetic record information read and transport speed information indicative of a transport speed at which the certain frame of the film is being transported, and an inspecting step of inspecting a magnetic reproducing state of the camera by detecting the magnetic record information and the transport speed information corresponding to the certain frame stored in the storing step.

The above and other objects and features of the invention will become apparent from the following detailed description of a preferred embodiment thereof taken in connection with the accompanying drawings.

BRIEF DESCRIPTION OF THE SEVERAL VIEWS OF THE DRAWING

FIGS. 3(a) and 3(b) are timing charts showing the reproduced signal output of magnetic record information recorded on the film and the output of a photo-reflector in the embodiment of the invention.

DETAILED DESCRIPTION OF THE INVENTION

Hereinafter, a preferred embodiment of the invention will be described in detail with reference to the drawings.

Figure 1:
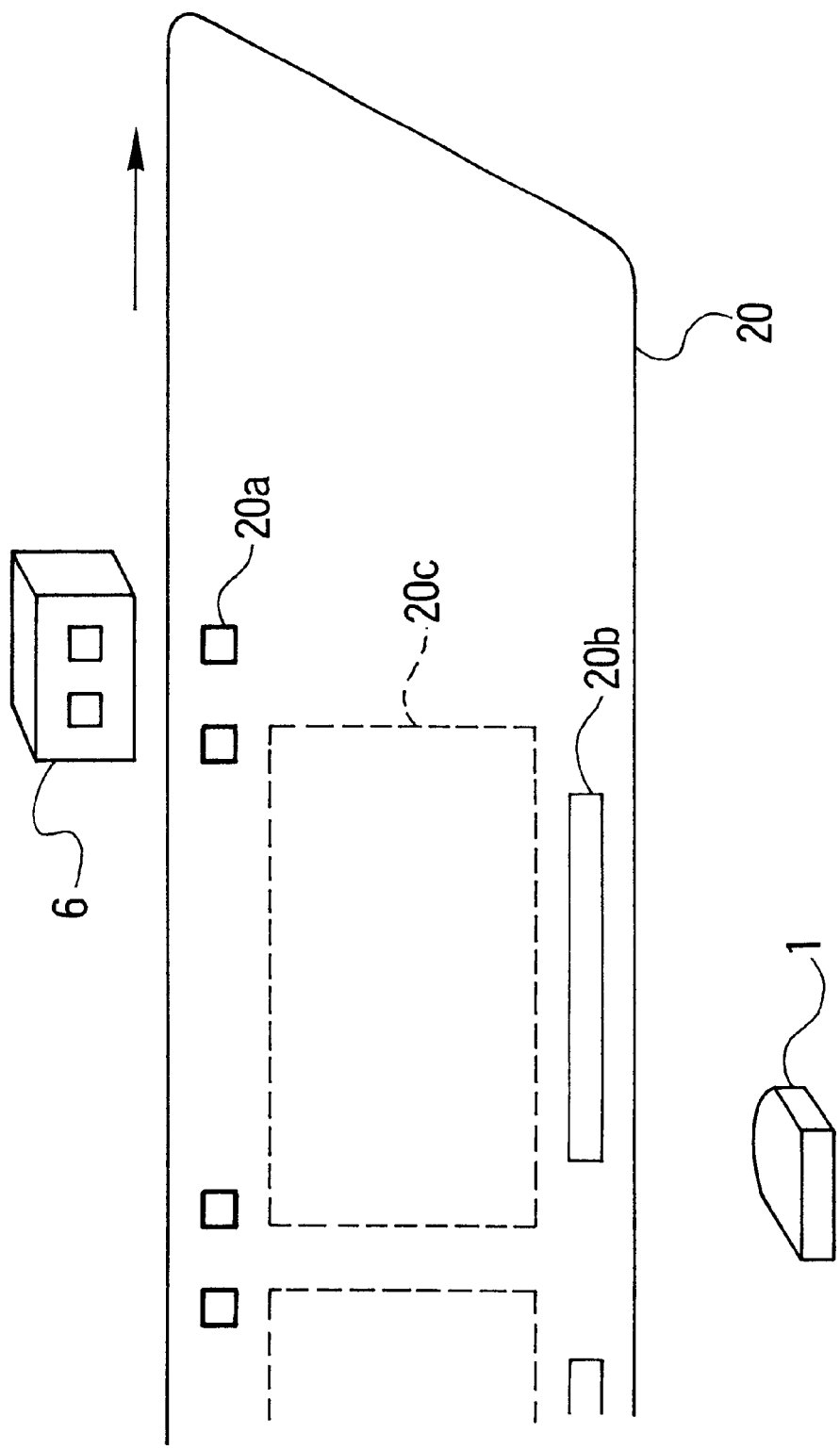
FIG. 1 is a diagram showing in part a camera according to an embodiment of the invention and a film loaded on the camera.

FIGS. 1 to 4 relate to the embodiment of the invention. FIG. 1 is a diagram showing in part the arrangement of a camera according to the embodiment of the invention and a film contained in a film cartridge used for the camera.

Referring to FIG. 1, a film 20 is provided with perforations 20a and magnetic recording parts 20b. As will be described in detail later herein, a film to be used in a test mode has magnetic information recorded at the magnetic recording part 20b beforehand at a suitable rate of recording density. The camera has an aperture part 20c, at which the film 20 is exposed to light from a photo-taking object.

The camera is further provided with a magnetic head 1 for recording and reproduction. Magnetic information is either recorded or reproduced on or from the film 20 by means of the magnetic head 1. A photo-reflector 6 is mounted on the camera. The photo-reflector 6 is arranged to detect the perforations 20a of the film 20 in a known manner. The frames of the film 20 are indexed and a film transport speed is detected by using information on the detection made by the photo-reflector 6. The film 20 is arranged to be taken up and wound by a motor in the direction of an arrow shown in FIG. 1 (to the right as viewed in FIG. 1).

Figure 2:
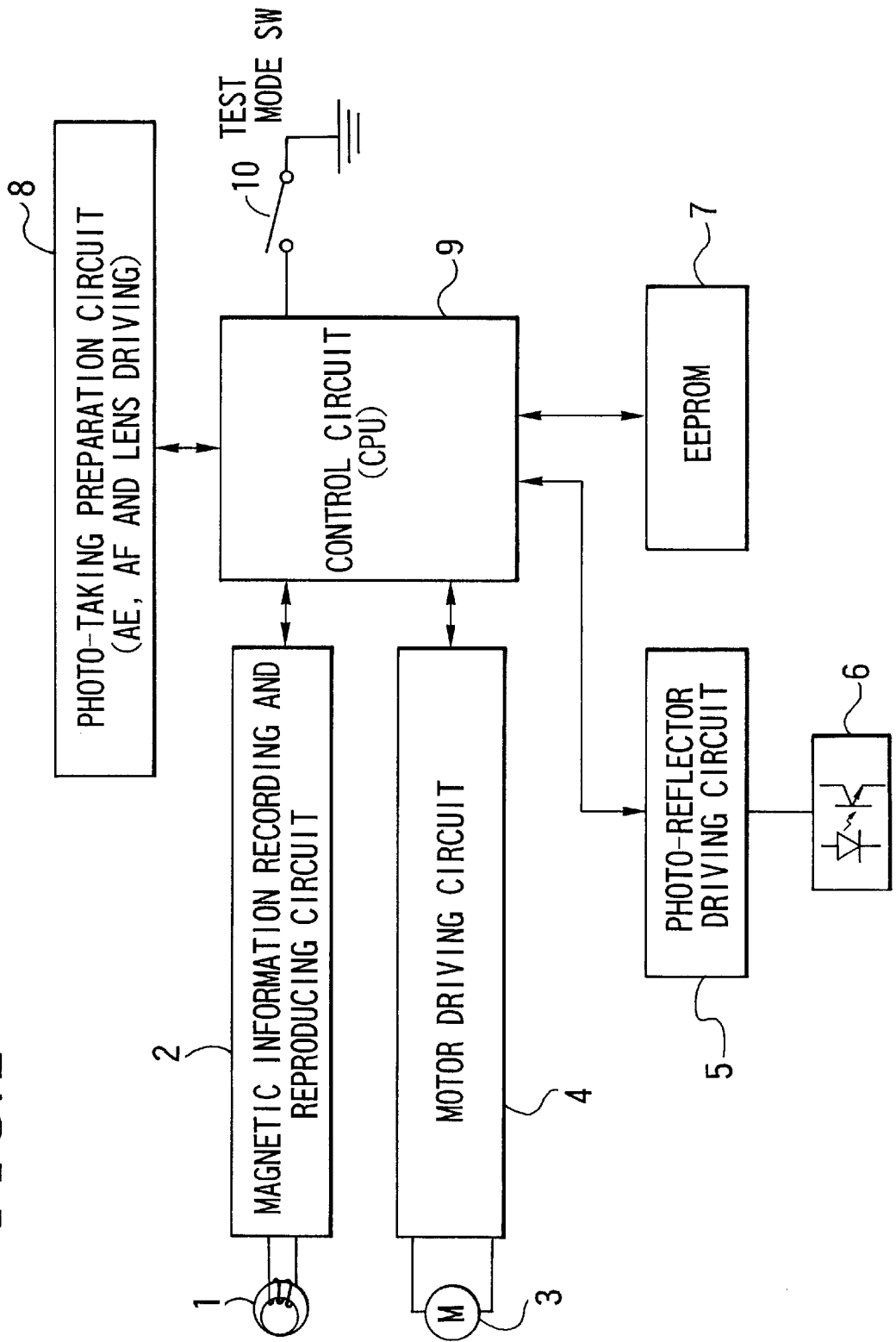
FIG. 2 is a block diagram showing the circuit arrangement of the camera according to the embodiment of the invention.

FIG. 2 is a block diagram showing the circuit arrangement of essential parts of the camera according to the embodiment of the invention. In FIG. 2, all parts that are shown also in FIG. 1 are indicated by the same reference numerals as in FIG. 1, and the details of them are omitted from the following description.

Referring to FIG. 2, a magnetic information recording and reproducing circuit 2 is arranged to record and reproduce magnetic information by driving the magnetic head 1. A motor 3 is arranged to wind and rewind the film 20. A motor driving circuit 4 is arranged to drive the motor 3. A photo-reflector driving circuit 5 is arranged to drive the photo-reflector 6. An EEPROM 7 is a nonvolatile storage element arranged to store the output level of a reproduced signal, the film frame number, a film transport speed, etc. A photo-taking preparation circuit 8 functions to obtain information (on the luminance of the object and a distance to the object) necessary in taking a shot with the camera and includes a circuit part arranged to set and reset a photo-taking lens. A control circuit 9 includes a CPU and is arranged to control the whole camera. A test mode switch 10 is arranged to indicate that the camera is in an inspection mode while the camera is in process of manufacture and to turn on when short-circuiting to the ground takes place.

FIGS. 3(a) and 3(b) show reproduction signal outputs of magnetic information recorded on the film 20 and perforation signals outputted from the photo-reflector 6. The reproduction signal output and the perforation signal shown in FIG. 3(a) are obtained when the transport speed of the film is relatively low, and the reproduction signal output and the perforation signal shown in FIG. 3(b) are obtained when the transport speed of the film is relatively high.

As shown in FIGS. 3(a) and 3(b), periods of time for which the perforation signals P1 and P2 and the perforation signals P1', P2', P3' and P4' are outputted vary with the transport speed of the film. This is because the size of the perforations formed in the film 20 always does not vary irrespective of the kind of the film and the frame number of the film.

The reproduced signal of magnetic information is outputted between one perforation and another (for example, between the perforation signals P1 and P2). As apparent by comparison of FIGS. 3(a) and 3(b), the level value of the reproduced signal outputs (for example, $V_{P1}'$, $V_{P2}'$, $V_{P3}'$ and $V_{P4}'$) which are obtained when the film transport speed is high as shown in FIG. 3(b) is larger than that of the reproduced signal outputs (for example, $V_{P1}$ and $V_{P2}$) which are obtained when the film transport speed is low as shown in FIG. 3(a). This difference in reproduced signal level value is caused by a difference in speed at which the magnetic recording part 20b of the film 20 passes the magnetic head 1.

As apparent from FIGS. 3(a) and 3(b), the transport speed of the film can be measured by measuring the outputting time of the perforation signals (for example, P1 and P1') which are outputted from the photo-reflector 6. Then, the output level value of a reproduced signal output corresponding to the transport speed of the film measured immediately before can be obtained by measuring the output level of a reproduced signal output obtained immediately after measuring the transport speed of the film.

The reproduced signal output can be measured by a peak-hold method or by continuously A/D-converting the output and computing its effective value.

The film transport speed, the output level value of the reproduced signal and the frame number of the film corresponding to the film transport speed, etc., obtained in the above-stated manner are stored as data in the EEPROM 7 which is disposed inside of the camera while the film is in process of transport. After that, the data stored in the EEPROM 7 is read, for example, with a tool, so as to be used as history information on the individual camera.

Figure 4:
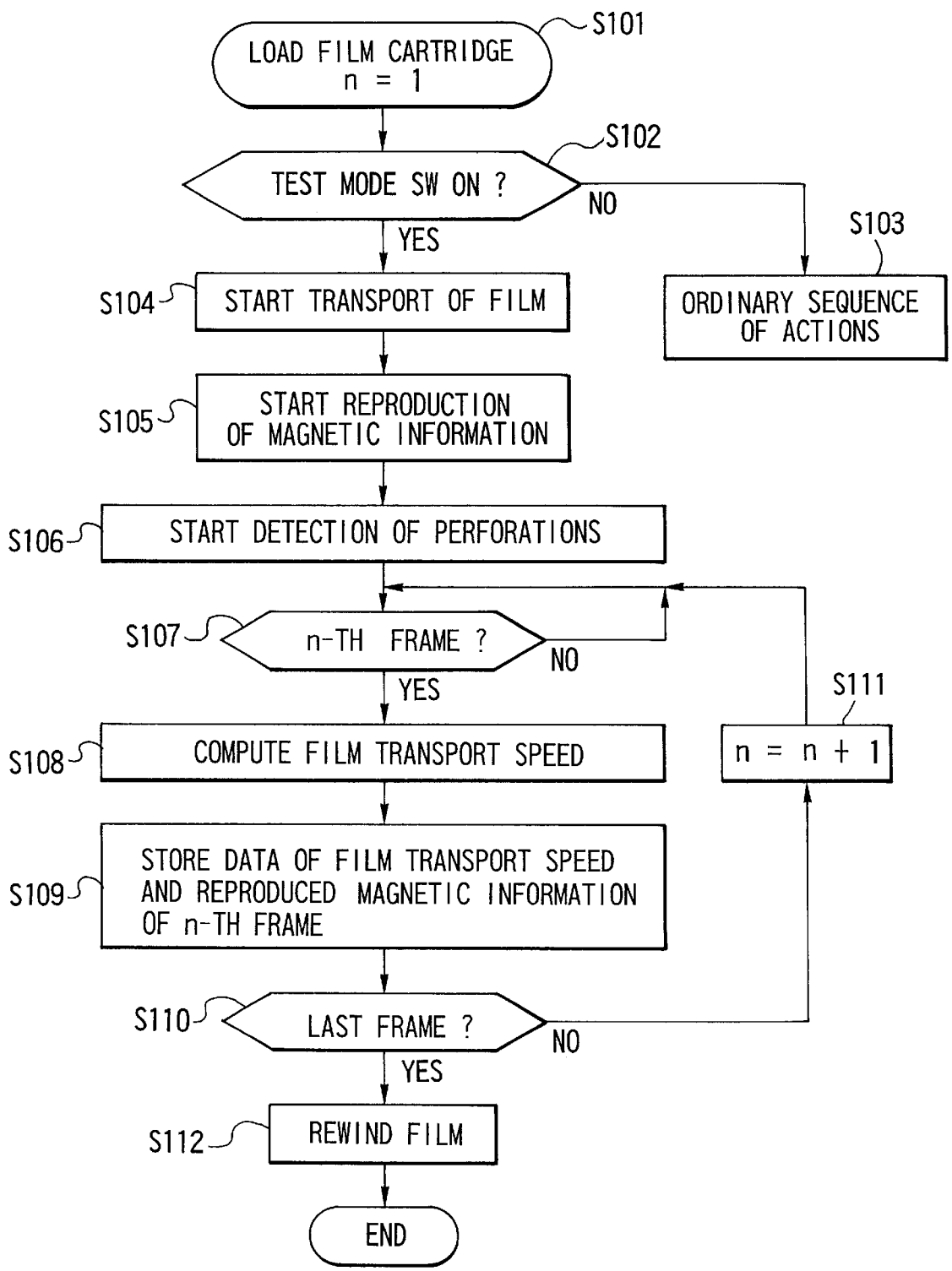
FIG. 4 is a flow chart showing a flow of actions of essential parts of the camera according to the embodiment of the invention.

FIG. 4 is a flow chart showing a flow of the actions of the essential parts of the camera arranged as described above. An actual operation of the camera is described below with reference to FIG. 4.

Referring to FIG. 4, in step S101, when the camera is loaded with a film cartridge (not shown), the count value "n" of a film frame number counter is set to "1" (n=1). in the next step S102, a check is made to find if the test mode switch 10 is in its on-state. If not, the flow of operation proceeds to step S103 to perform an ordinary sequence of camera actions. If so, the flow proceeds to step S104. In step S104, the motor driving circuit 4 is caused to drive the motor 3 to start transporting the film. Here, a film cartridge to be used in the test mode is assumed to have magnetic information recorded at the magnetic recording part of every frame of a film contained therein.

In the next step S105, the magnetic information recording and reproducing circuit 2 is driven to start reproducing a signal obtained through the magnetic head 1. In the subsequent step S106, the photo-reflector driving circuit 5 is driven to start detecting the perforations 20a by detecting signals from the photo-reflector 6. In step S107, with the perforations 20a detected, a check is made for an n-th frame of the film 20. In this instance, since the flow comes to the step S107 for the first time, the current film frame count number "n" is "1" (n=1). The check is, therefore, made to find if the current frame is the first frame of the film. If not, the step S107 is repeated until the film position reaches the n-th frame. When the film position reaches the n-th frame, the flow proceeds from the step S107 to step S108.

In step S108, the film transport speed for the n-th frame is computed by measuring the outputting time of the film perforation signal, as described above with reference to FIGS. 3(a) and 3(b). In the next step S109, the reproduced signal output value of the n-th frame obtained after computing the film transport speed of the n-th frame, the film transport speed of the n-th frame, etc., are stored in the EEPROM 7. In the subsequent step S110 a check is made to find if the film position has reached the last frame of the film by a known deciding means (by using information on the bar code of the film cartridge, an end perforation of the film, or the like). If not, the flow proceeds to step S111 to increment the film frame number count value "n" by one (n=n+1). The flow then returns from the step S111 to the step S107. In other words, by repeating the steps S107 to S111, film transport speeds for all frames and all the output values of magnetic reproduced signals corresponding to the film transport speeds are stored in the EEPROM 7.

If the film position is found in the step S110 to be the last frame, the flow proceeds from the step S110 to step S112. In the step S112, the motor driving circuit 4 is caused to drive the motor 3 in the direction of film rewinding. The flow of operation in the test mode comes to an end upon completion of rewinding of the film.

In the case of FIG. 4, the check for the test mode is made in the step S102 through the state of the test mode switch 10. However, this arrangement may be changed to set data of a designated address of the EEPROM 7 and to find whether or not the camera is in the test mode by making a check for the data.

The magnetic information reproducing function is checked in the test mode as mentioned above. According to the conventional arrangement, the check is made only through the output value of the magnetic reproduced signal. However, in the event of some abnormality of the output value, it has been extremely difficult to ascribe the abnormality to a fault in a circuit system including the magnetic head, to a magnetic head mounting error or to inconstancy of the film transport speed.

In the case of the embodiment of the invention, on the other hand, the film transport speeds for frames of the film and the output values of magnetic reproduced signal corresponding to the film transport speeds are stored. Therefore, after the test, any abnormality of reproduction outputs can be promptly decided at least as to whether it is ascribable to inconstancy of the film transport speed or not.

Further, the above-stated data is stored in the nonvolatile storage means, such as an EEPROM, disposed inside of the camera, the data in storage, therefore, never disappears even after the shipment of the camera and thus remains useful also as history information of the individual camera.

As described in the foregoing, according to the invention, the film transport speeds of frames and the output level values of signals reproduced from the film frames are stored as data in a storage means. The data stored in the storage means is arranged to be usable for inspection of a reproduction output of magnetic information during the manufacturing process for cameras. Accordingly, it is possible to provide a camera capable of permitting simplification of inspection of a magnetic information reproduction output.

What is claimed is:

1. A camera comprising:
   a magnetic head member arranged to read magnetic information recorded in each of a plurality of frames on a film;
   transport means for transporting the film;
   speed detecting means for detecting transport speed information indicative of a speed of at least one frame which is being transported by said transport means;
   level detecting means for detecting a signal output level of magnetic information read out from said at least one frame by said magnetic head member; and
   storing means for storing the transport speed information detected by said speed detecting means and the signal output level detected by said level detecting means.

2. A camera according to claim 1, wherein said storing means is a nonvolatile recording medium.

3. A camera according to claim 1, wherein said speed detecting means detects information related to an interval between a plurality of perforations formed in the film.

4. A camera according to claim 1, wherein said storing means stores therein the transport speed information and the signal output level for each of a plurality of frames.

5. A camera comprising:
   a magnetic head member arranged to read magnetic information recorded in each of a plurality of frames on a film;
   transport means for transporting the film;
   first storing means for storing transport speed information indicative of a speed of at least one frame which is being transported by said transport means; and
   second storing means for storing a signal output level of magnetic information read out from said at least one frame by said magnetic head member.

6. A camera according to claim 5, wherein said storing means is a nonvolatile recording medium.

7. A camera according to claim 5, wherein the transport speed information is information related to an interval between a plurality of perforations formed in the film.

8. A camera according to claim 5, wherein said storing means stores therein the transport speed information and the signal output level for each of a plurality of frames.

9. An inspecting method for a camera having a magnetic head arranged to read magnetic record information recorded on a film, comprising:
   a storing step of reading, with the magnetic head, the magnetic record information recorded at a certain frame of the film and storing the magnetic record information read and transport speed information indicative of a transport speed at which the certain frame of the film is being transported; and
   an inspecting step of inspecting a magnetic reproducing state of said camera by detecting the magnetic record information and the transport speed information corresponding to the certain frame stored in said storing step.

10. A camera comprising:
    a magnetic head member arranged to read magnetic information recorded in each of a plurality of frames on a film;
    a transport member that transports the film;
    a speed detecting circuit that detects transport speed information indicative of a speed of at least one frame which is being transported by said transport member;
    a level detecting circuit that detects a signal output level of magnetic information read out from said at least one frame by said magnetic head member; and
    a memory circuit that stores the transport speed information detected by said speed detecting circuit and the signal output level detected by said level detecting circuit.

* * * * *

UNITED STATES PATENT AND TRADEMARK OFFICE
CERTIFICATE OF CORRECTION

PATENT NO. : 6,397,013 B1
DATED : May 28, 2002
INVENTOR(S) : Teruyuki Ohkado

It is certified that error appears in the above-identified patent and that said Letters Patent is hereby corrected as shown below:

Column 6,
Line 8, after "transporting the film" insert -- storing means including: --.

Signed and Sealed this

Third Day of December, 2002

JAMES E. ROGAN
*Director of the United States Patent and Trademark Office*